(12) United States Patent
Cornelissen et al.

(10) Patent No.: US 8,469,578 B2
(45) Date of Patent: Jun. 25, 2013

(54) OPTICAL ELEMENT HAVING AT LEAST ONE EMBEDDED REFLECTOR

(75) Inventors: Hugo Johan Cornelissen, Eindhoven (NL); Hendrik Johannes Boudewijn Jagt, Eindhoven (NL); Willem Lubertus Ijzerman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 339 days.

(21) Appl. No.: 12/522,725

(22) PCT Filed: Jan. 10, 2008

(86) PCT No.: PCT/IB2008/050076
§ 371 (c)(1),
(2), (4) Date: Jul. 10, 2009

(87) PCT Pub. No.: WO2008/087568
PCT Pub. Date: Jul. 24, 2008

(65) Prior Publication Data
US 2010/0053976 A1    Mar. 4, 2010

(30) Foreign Application Priority Data
Jan. 19, 2007  (EP) .................................... 07100784

(51) Int. Cl.
*F21V 7/04*    (2006.01)

(52) U.S. Cl.
USPC ............ 362/617; 362/618; 362/619; 362/620

(58) Field of Classification Search
USPC .................................. 362/617–620
See application file for complete search history.

(56) References Cited

U.S. PATENT DOCUMENTS

| | | | | |
|---|---|---|---|---|
| 3,641,332 A * | 2/1972 | Reick et al. | ................ | 362/582 |
| 4,703,999 A * | 11/1987 | Benson | ................ | 359/532 |
| 5,691,846 A | 11/1997 | Benson et al. | | |
| 5,754,338 A * | 5/1998 | Wilson et al. | ................ | 359/530 |
| 7,611,251 B2 * | 11/2009 | Thakkar et al. | ................ | 359/530 |
| 2003/0095332 A1 | 5/2003 | Gardner et al. | | |
| 2006/0002141 A1 | 1/2006 | Ouderkirk et al. | | |
| 2006/0221268 A1 | 10/2006 | Ko et al. | | |

FOREIGN PATENT DOCUMENTS

| | | |
|---|---|---|
| DE | 19716186 A1 | 10/1998 |
| WO | 9102990 A1 | 3/1991 |
| WO | 9812581 A1 | 3/1998 |
| WO | 0043813 A1 | 7/2000 |
| WO | 0111422 A2 | 2/2001 |

* cited by examiner

*Primary Examiner* — Sean Gramling (57) ABSTRACT

An optical element includes a first optical member with at least one indentation at a first surface thereof, and a second optical member attached to the first surface. The second optical member conforms to the at least one indentation in the first optical member. The optical element further includes at least one reflector at an interface between the first and second optical members, where the at least one reflector is located at the at least one indentation. The reflector is formed by an interface between a cavity formed between the first and second optical members and at least one of the first and second optical members.

15 Claims, 4 Drawing Sheets

OPTICAL ELEMENT HAVING AT LEAST ONE EMBEDDED REFLECTOR

TECHNICAL FIELD OF THE INVENTION

The present invention relates to an optical element having at least one reflector embedded therein, an illumination device comprising such an optical element, and a method for manufacturing such an optical element.

TECHNICAL BACKGROUND

Lighting and illumination is becoming increasingly sophisticated in order to allow consumers to take advantage of the recent advancements in areas such as solid state lighting and flat panel display technology. For example, there is, for various applications a drive towards achieving thin, large area illumination devices or luminaires having advantageous illumination properties. For that purpose, as well as for numerous other applications, there is a need for the ability to accurately control the direction of light in a compact structure, and to achieve this in an inexpensive manner.

One approach for controlling the direction of light in such a structure is disclosed in US 2003/0095332, in which an optical element for use in a display apparatus is described. This optical element is formed by a light directing film, which has one surface with saw-tooth formations. This surface is provided with a metal coating which is protected by a polymer protective layer. The metal coating forms an internal reflector in the light directing construction.

This reflector, however, is prone to being damaged though corrosion and is typically formed in an inherently expensive vacuum process.

SUMMARY OF THE INVENTION

In view of the above-mentioned and other drawbacks of the prior art, a general object of the present invention is to provide an improved optical element, in particular having a more durable reflector.

According to a first aspect of the present invention, these and other objects are achieved through a method for manufacturing an optical element having at least one reflector embedded therein, comprising the steps of: providing a first optical member, having at least a first surface with a structure formed therein, wherein at least a portion of this structure is configured to have a lower threshold for release of a substance adhered thereto than neighboring portions of the surface, this portion defining a desired position and extension of the reflector; providing on the first surface of the first optical member a second optical member formed by a shrinkable substance; and shrinking the substance such that the second optical member is released from the first optical member at the above-mentioned portion and a cavity is formed between the first and second optical members, enabling total internal reflection at at least one of a first interface between the first optical member and the cavity and a second interface between the second optical member and the cavity.

By "optical member" should, in the context of the present application, be understood a member which is at least partly transmissive, e.g. translucent or even transparent, to electromagnetic radiation of at least one wavelength within the wavelength range including visible light, infrared light and ultra-violet light. Apart from its transmissivity/translucency/transparency to such radiation, the optical member may have any kind of suitable further properties, such as, for example, being isotropic or anisotropic.

When the shrinkable substance of the second optical member is made to shrink, stress is induced at the interface between the first and second optical members. By configuring the interfacing surface of the first optical member properly, the stress due to the shrinking results in release between the first and second optical members at selected locations at the interface therebetween. When the second optical member continues to shrink, the first and second optical members separate at the locations of release, which leads to the formation of cavities at these locations. At one or both of the interfaces between each of these cavities and the first and second optical members, an efficient reflector functioning by means of total internal reflection (TIR) is thus formed.

Through the method according to the invention, very efficient, robust and compact reflectors, reflecting by means of total internal reflection (TIR) can thus be formed internal to an optical element.

Furthermore, the size and location of the at least one reflector can be precisely controlled through a proper configuration of the first optical member and/or control of the shrinking step.

The portion defining the desired position and extension of the at least one reflector may, moreover, be different from adjacent portions of the surface with respect to at least one of geometry and surface properties, in order to obtain the above-mentioned lower threshold for release.

For example, the portion may be treated to promote release of a substance, such as through the application of a release-enhancing agent to that particular portion of the surface prior to the provision of the shrinkable substance of the second optical member, or, alternatively, the portions of the surface adjacent to the reflector-defining portion may be treated to promote adhesion thereto. Both of these schemes result in that a substance, such as in particular the shrinkable substance of the second optical member, will be more prone to be separated from the reflector-defining portion than from the adjacent portions of the surface when the boundary between the first and second optical members is subjected to stress induced by the shrinking of the shrinkable substance of the second optical member.

As another example, the geometry of the structure may be selected such that the stress induced by the shrinking becomes greater at the reflector-defining portion than at adjacent portions and/or is applied in a direction which is more efficient for breaking bonds between the first and second optical members.

According to one embodiment, the structure may be an indentation, such as a groove.

The indentation(s) may typically be adapted to the particular application intended for the optical element, and may be essentially point-shaped, elongated, or have any other shape.

In the particular case of the indentation being a groove, it should be noted that such a groove refers to an indentation which has a larger extension in one direction parallel to the surface than in a perpendicular direction parallel to the surface. It should, furthermore, be noted that such a groove is not limited to a particular length or direction of extension, or cross-section. Consequently, the groove here referred to may have a simple, symmetrical, V-shaped cross-section, or have a more complex cross-section, which may or may not be symmetrical with respect to an imaginary groove center line parallel to a local gradient of the first surface. Furthermore, the groove may or may not have a principal direction of extension, and may, in the latter case form a closed loop.

Advantageously, the shrinkable substance may be adapted to fill the at least one indentation when being provided on the first surface of the first optical member.

For example, the shrinkable substance may be applied in a form in which it is deformable by the first optical member, such that it conforms to the structure(s) in the surface of the first optical member. To this end, the shrinkable substance may, for example, be applied in form of a liquid, a paste or a deformable sheet.

According to one embodiment, the shrinkable substance may comprise a polymerizable material, and the shrinking step may include the step of polymerizing the material.

Many substances shrink upon polymerization. Furthermore, this shrinking may take place without any evaporation or other form of extraction of material being necessary. Moreover, the shrinking is typically irreversible.

The polymerizable material may be primarily formed from monomers, but may alternatively or in addition be formed from larger polymer building blocks, such as dimers or partial polymer chains.

In addition to a polymerizable material, the shrinkable substance may, according to the present embodiment, comprise additional substances, such as various kinds of controlling substances, including, for example, activators or initiators for enabling the polymerization to be initiated and/or controlled, and so-called inhibitors for preventing unwanted polymerization.

Advantageously, the polymerizeable material may be photo-polymerizeable, and the step of polymerizing may comprise the step of irradiating the photo-polymerizeable material with light having a suitable wavelength range.

In the case of photo-polymerization, the above-mentioned inhibitors may be used to prevent premature polymerization due to accidental environmental UV-radiation. Typically, such an inhibitor is a molecule capable of reacting with any radicals which are accidentally formed and which would otherwise lead to a rapid chain-polymerization process.

By means of photo-polymerization, shrinking of the second optical member may be performed even in cases when the shrinkable substance is not directly accessible from the outside of the optical element in which it is included. Furthermore, the polymerization, and accompanying hardening of the second optical member, may be controlled by the manner in which the irradiation step is performed. Parameters related to the irradiation step that can be varied to control the polymerization, and thereby the shrinking, include direction of irradiation, intensity of irradiation, duration of irradiation, and wavelength range. For example, through a suitable selection of irradiation parameters and/or composition of the shrinkable substance, the side of the second optical member facing away from the first optical member may be made to harden first, such as to prevent material transport toward the structure(s) where it is desired that the shrinking of the second optical member should lead to separation from the reflector-defining portion of the structure.

As an alternative or complement to photo-polymerization, the polymerization reaction may be thermally activated by means of a thermally unstable initiator that will result in the formation of reactive radicals at an elevated temperature.

Moreover, the method according to the present invention may further comprise the step of providing a third optical member on top of the second optical member, for restricting material transport of said shrinkable substance during shrinking.

In order to obtain a sufficient level of stress at the reflector-defining portion(s), equalizing material transport from other parts of the second optical element should be avoided, or at least restricted. As an alternative to the the above-mentioned control of the hardening, sometimes referred to as "vitrification", of the shrinkable substance, a suitable third optical member may be provided for the purpose of restricting material transport, and an accompanying reduction in the stress on the interface between the first and second optical members at the reflector-defining portion(s).

Advantageously, the third optical member may be a relatively rigid sheet, which, on a side thereof facing the second optical member, may be treated to achieve a good adhesion to the shrinkable substance.

In case of the third optical member being a sheet, this sheet should preferably be sufficiently rigid to fulfill the following two requirements: it should be capable of preventing material transport towards the structure(s) in the first optical member substantially without being locally deformed, and it should essentially prevent deformation on a macroscopic scale of the second optical member upon shrinking.

The above-mentioned surface-treatment, which may include surface-roughening or other methods for increasing the surface area of the third optical member and/or application of an adhesion promotion agent, should be adapted to achieve a sufficiently strong adhesion between the second optical member and the third optical member such that there is no release or "delamination" between the second and third optical members upon shrinking of the second optical member.

Following the shrinking step, the third optical member may be left on top of the second optical member or, optionally, be removed. In the latter case, the adhesion between the second and third optical members may be tuned to enable release between the second and third optical members to occur before the second optical member is separated from the first optical member.

According to a second aspect of the present invention, the above-mentioned and other objects are achieved through an optical element, comprising a first optical member having at least one indentation at a first surface thereof, a second optical member attached to the first surface of the first optical member, the second optical member essentially conforming to the at least one indentation in the first optical member, and a at least one reflector at an interface between the first and second optical members, the at least one reflector being located at the at least one indentation, wherein said at least one reflector is formed by an interface between a cavity formed between the first and second optical members and one of the first and second optical members.

The optical element may advantageously comprise a plurality of reflectors, each being located at a respective one of a plurality of indentations in the first optical member.

According to one embodiment, the indentations may be grooves.

Advantageously, each of a plurality of consecutive cavities may be formed on the same side of their respective grooves with respect to the above-defined groove center line.

An effect of this is that the optical element can be adapted to direct substantially all light entering it in a first direction towards a second direction.

The cavities may be formed on one side only of their respective grooves, or may, alternatively, be formed on both sides of their respective grooves.

In order to accomplish consecutive cavities being formed on the same side of their respective grooves, the cross-section of each of the grooves may be asymmetrical with respect to at least one of geometry and surface properties.

Furthermore, a cross-section of each of the indentations may form a closed loop in a plane parallel to the first surface of the first optical member.

At least one of these closed loop indentations may be a groove which extends along a closed loop over the surface of the first optical member.

Moreover, at least one of the closed loop indentations may be an extended point indentation in the first optical member, and may, for example, define a collimating reflector for a light-source.

The cross-sections of these closed loop indentations may, furthermore, be concentric in a given plane parallel to the first surface.

Such concentric closed-loop indentations may, for example, comprise a plurality of concentric grooves, or one extended point indentation and at least one concentric groove.

Furthermore, the optical element according to the present invention may advantageously be comprised in an illumination device further comprising at least one light source arranged to couple light into the optical element.

Such illumination devices may, for example, be adapted for use as backlights/frontlights for display applications as well as for general illumination purposes.

In one example of such an illumination device, the optical element according to the present invention may be essentially slab shaped, having a top face and a bottom face and edges. In this case, a plurality of reflectors may be formed to direct light being incoupled at at least one of the edges to exit through one or both of the upper and lower faces. For example, the plurality of reflectors may be located on the same sides of parallely extending grooves, thereby enabling substantially all of the incoupled light to exit through one of the upper and lower faces, depending on inclination of the reflectors.

According to another example of such an illumination device, the embedded reflectors may be formed such that at least one reflector surrounds the optical axis of each of a plurality of light-sources arranged to incouple light through, for example, the bottom face of the optical element. The reflector(s) surrounding each optical axis may then preferably be configured to function as a collimator for that particular light source.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION OF A PREFERRED EMBODIMENT OF THE INVENTION

In the following description, the present invention is described with reference to optical elements having a plurality of reflectors formed at a material interface between a first optical member and a second optical member upon shrinking of the second optical member. In the description, the second optical member is provided in form of a photo-polymerizeable material which conforms to structures formed in the first optical member, and a third optical member is provided on top of the second optical member.

It should be noted that this by no means limits the scope of the invention, which is equally applicable to such optical elements not having a third optical member and optical elements in which the second optical member is not provided in form of a photo-polymerizeable material, but as a material which is shrinkable due to any other mechanism or combination of mechanisms, such as polymerization which is initiated in other ways known to the skilled person, including thermally induced polymerization, solvent evaporation, shrinking due to cooling, or any kind of chemical reaction leading to a volume reduction.

Figure 1:
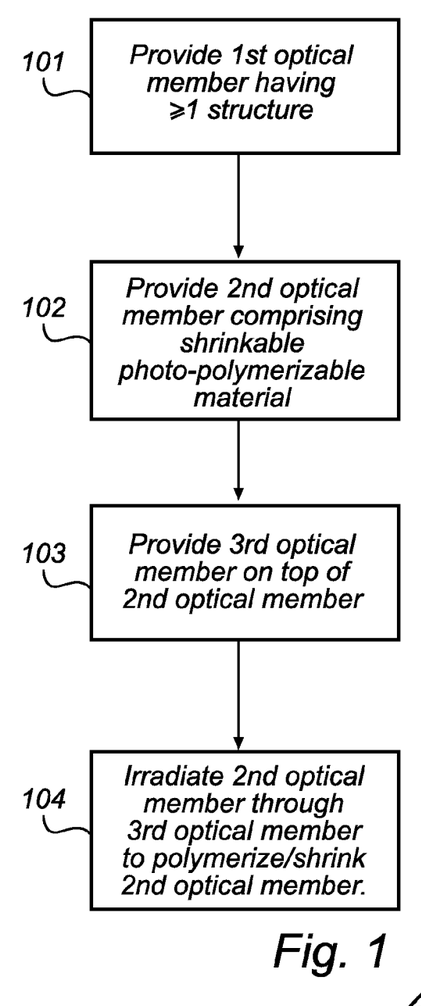
FIG. 1 is a flow chart schematically illustrating a method for manufacturing an optical element according to a preferred embodiment of the present invention.

A preferred embodiment of an optical element according to the present invention and a method for manufacturing such an optical element will now be described with reference to FIG. 1 which is a flow chart schematically illustrating such a method and FIGS. 2a-d which schematically illustrate the optical element in states following the corresponding method steps of FIG. 1.

Figure 2A:
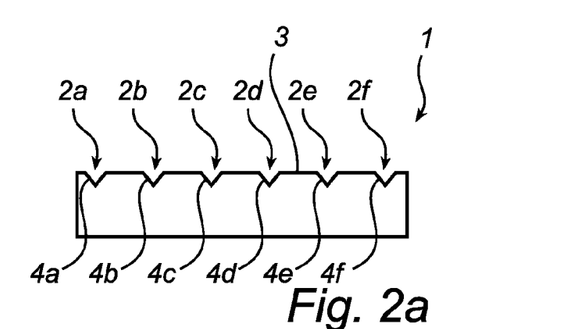
FIGS. 2a-d schematically illustrate the optical element manufactured according to the method of FIG. 1 in states following the corresponding method steps.

In a first step 101, a first optical member 1 having structures 2a-f on a top surface 3 thereof is provided. The first optical member 1 has a first index of refraction $n_1$. In the present embodiment, the structures 2a-f are illustrated as indentations being formed as V-shaped grooves, but, as will be further elucidated below, this is only one of the possible structures.

Each of the structures 2a-f have a portion 4a-f which is adapted to have a lower threshold for release than neighboring portions of the surface 3. Each of these portions 4a-f defines the location and extension of a respective reflector to be formed.

Figure 2B:
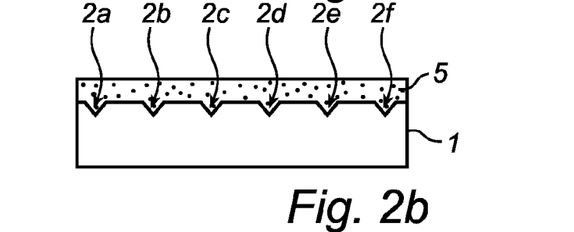

In a subsequent step 102, a second optical member 5 is provided, which comprises a shrinkable photo-polymerizeable material. The second optical member 5, in its current state, conforms to the top surface 3 of the first optical member 1 such that the structures 2a-f are filled. Following shrinking, the second optical member 5 has a second index of refraction $n_2$.

Figure 2C:
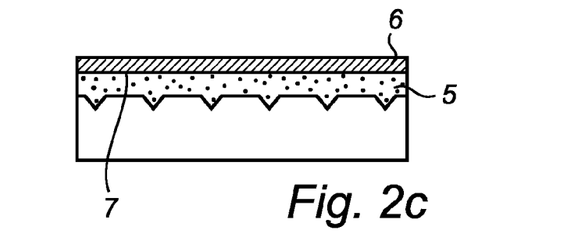

In the next step 103, a third optical member 6 is provided on top of the second optical member 5. The third optical member 6 is preferably formed by a sheet which is sufficiently rigid to prevent macroscopic deformation to occur to the optical element upon shrinking of the second optical member 5. The third optical member has a third index of refraction $n_3$. Furthermore, the side 7 of the third optical member 6 facing the second optical member 5 is advantageously configured to promote adhesion between the second optical member 5 and the third optical member 6. This is done to prevent release of the second optical member 5 from the third optical member 6 upon shrinking of the the second optical member 5.

Figure 2D:
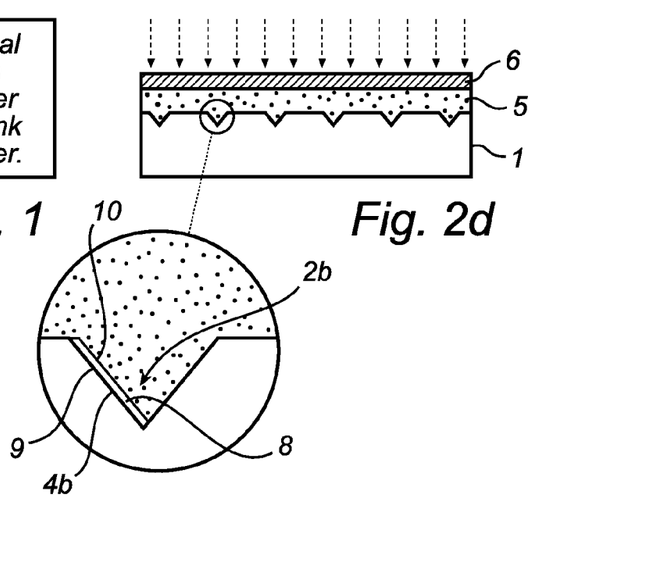

In a following step 104, the second optical member 5 is irradiated through the third optical member 6 as illustrated by the dashed arrows in FIG. 2d. When irradiated by radiation having a suitable wavelength range (usually within the UV-region), intensity and duration, the photo-polymerizeable material comprised in the second optical member 5 polymerizes and, due to the formation of short chemical bonds, shrinks. The shrinking of the second optical member 5 results in stress on all surfaces of the first 1 and third 6 optical members adjacent to the second optical member 5. Since the portions 4a-f of the structures 2a-f formed in the first optical member 1 have a lower threshold for release than neighboring portions of the surface 3 and the surface 7 of the third optical member 6 facing the second optical member has been configured to have a high adhesion to the second optical member 5, there will be delamination upon shrinking between the first optical member 1 and the second optical member 5 at the reflector-defining portions 4a-f, as indicated for the portion 4b in the enlargement of FIG. 2d.

As is also indicated in FIG. 2d, the shrinking will not only lead to delamination, but also to the formation of a cavity 8 (only indicated for the enlarged structure 2b, but present for each of the structures 2a-f). It is expected that this cavity is rather rapidly filled with gas having been molecularly dissolved in the first 1 and/or second 5 optical members. The cavity will have a fourth index of refraction $n_4$, and irrespective of whether and by which gas the cavity 8 is filled, there will be a large selection of suitable materials for the first 1 and second 5 optical members for which the respective indices of refraction $n_1$, $n_2$ are larger than $n_4$.

Consequently, the formation of the internal cavity 8 through shrinking the second optical member 5 enables total internal reflection (TIR) at either of the interfaces 9, 10 between the cavity 8 and the first 1 and second 5 optical members, respectively.

Further details regarding possible material selections and processing conditions etc. will be provided in the Experiment section below.

FIGS. 3a-e schematically illustrate different reflector-defining structure configurations for controlling the threshold for release of a substance adhered thereto.

Figures 3A, 3B:
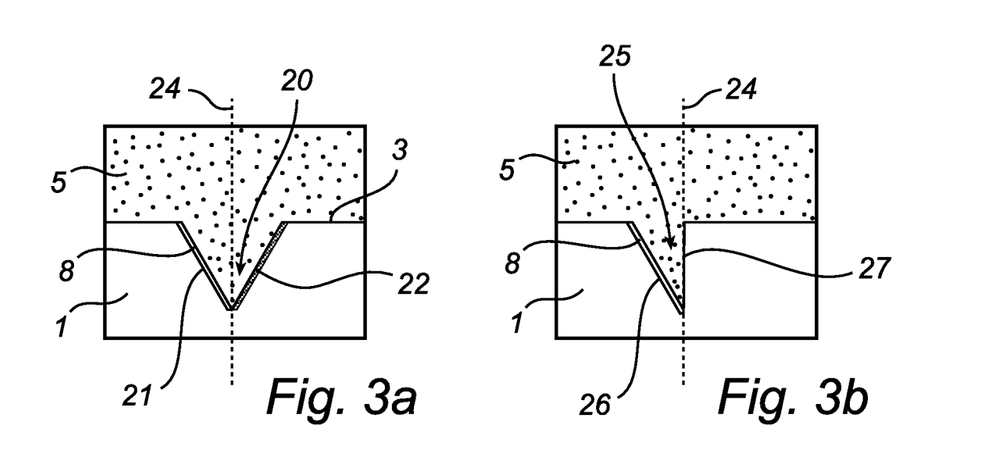
FIGS. 3a-e schematically illustrate different reflector-defining structure configurations for controlling release threshold.

In FIG. 3a, which is a schematic cross-section view of an indentation 20 having a geometrically symmetric, about a line 24 parallel to a gradient to the top surface 3 of the first optical member 1, V-shaped cross-section, it can be seen that the cavity 8 is formed at a material interface between the first optical member 1 and the second optical member 5 at a first side 21 of the indentation 20, while the second optical member 5 is still in contact with the first optical member 1 at a second side 22 of the indentation. This is, according to the presently illustrated example, due to that the second side 22 of the indentation is adapted for improved adhesion to the second optical member 5. This adaptation may be mechanical or chemical, and, obviously, the same result may be obtained by instead adapting the first side 21 of the indentation 20 for improved release from the second optical member 5.

FIG. 3b schematically illustrates a second configuration of an indentation 25 which has an asymmetric cross-section with respect to the line 24. In this configuration, the geometry favors release of the second optical member 5 from the first optical member 1 at a first side 26, since the stress induced at the interface between the first 1 and second optical members 5 at the first side 26 will have a larger shear component than at a second side 27 of the indentation 25. Since shear stress is generally more efficient for breaking bonds acting across an interface, delamination and formation of a cavity 8 will, as illustrated, occur at the first side 26 and not at the second side 27.

Figure 3C:
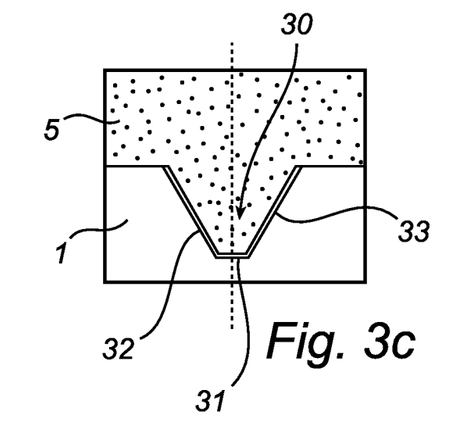

In FIG. 3c, a further example is illustrated, in which an indentation 30 having a flat bottom portion 31 is formed in the first optical member 1. Through the symmetric configuration of the indentation 30 and the oblique angles between the flat bottom portion 31 and the first 32 and second 33 sides of the indentation 30, two-sided delamination is expected to occur as indicated in FIG. 3c. Furthermore, the flat bottom portion 31 may or may not delaminate depending on how it is configured.

Figure 3D:
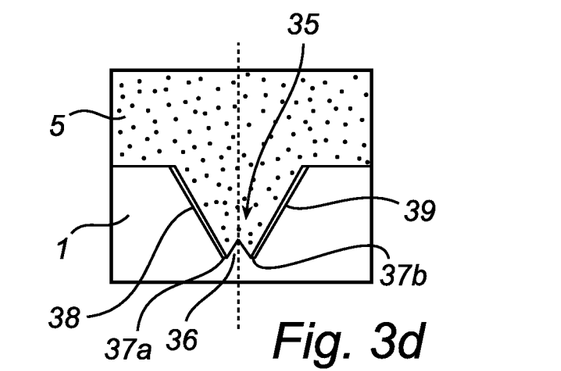

In FIG. 3d, a structure is illustrated which differs from the one shown in FIG. 3c in that the bottom portion 36 of the indentation 35 is not flat, but structured such that there is a sharp edge 37a-b associated with each of the sides 38 and 39, respectively, of the indentation 35. Each of the sharp edges 37a-b is expected to act as a nucleation site for delamination for its respective side 38, 39, thereby enabling stable two-sided delamination rather than more or less random one-sided delamination.

Figure 3E:
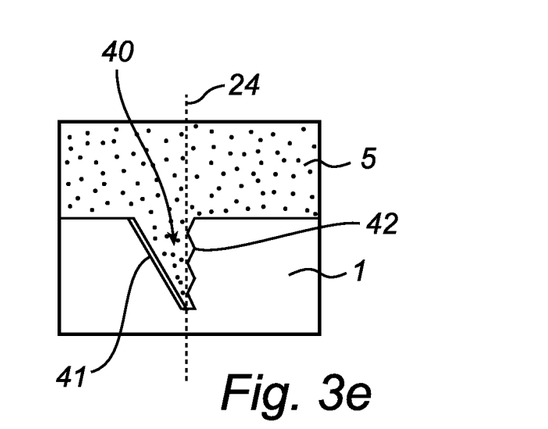

Finally, the structure illustrated in FIG. 3e relies upon a combination of asymmetry in surface properties and geometry with respect to the line of symmetry 24. The indentation 40 in FIG. 3e has a first side 41 which is inclined and "smooth", and a second side 42 which is vertical and "rough". Due to the geometrical asymmetry, release is favored for the first side 41 as discussed above in connection with FIG. 3b, and, additionally, the adhesion of the second optical member 5 to the second side 42 is improved through the structured surface thereof.

As should be clear from the above representative examples of release controlling structure configurations, the possibilities for variation are virtually endless. However, these configurations all have in common that the geometry and/or the surface properties of the structures and/or their surroundings are adapted to achieve a lower threshold for release at at least a portion of the structure.

Figure 4A:
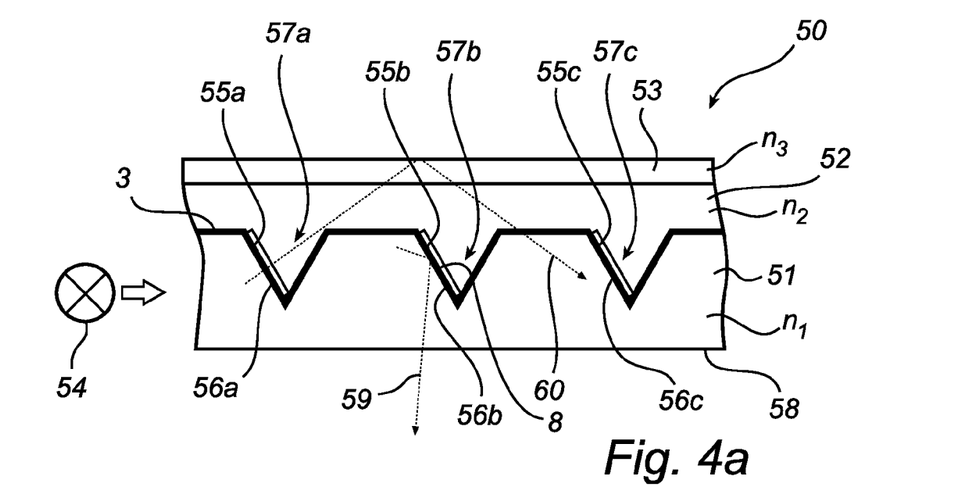
FIG. 4a-b are schematic cross-section views of embodiments of the optical element according to the present invention, in which the optical element functions to outcouple light from a light guide.
Figure 4B:
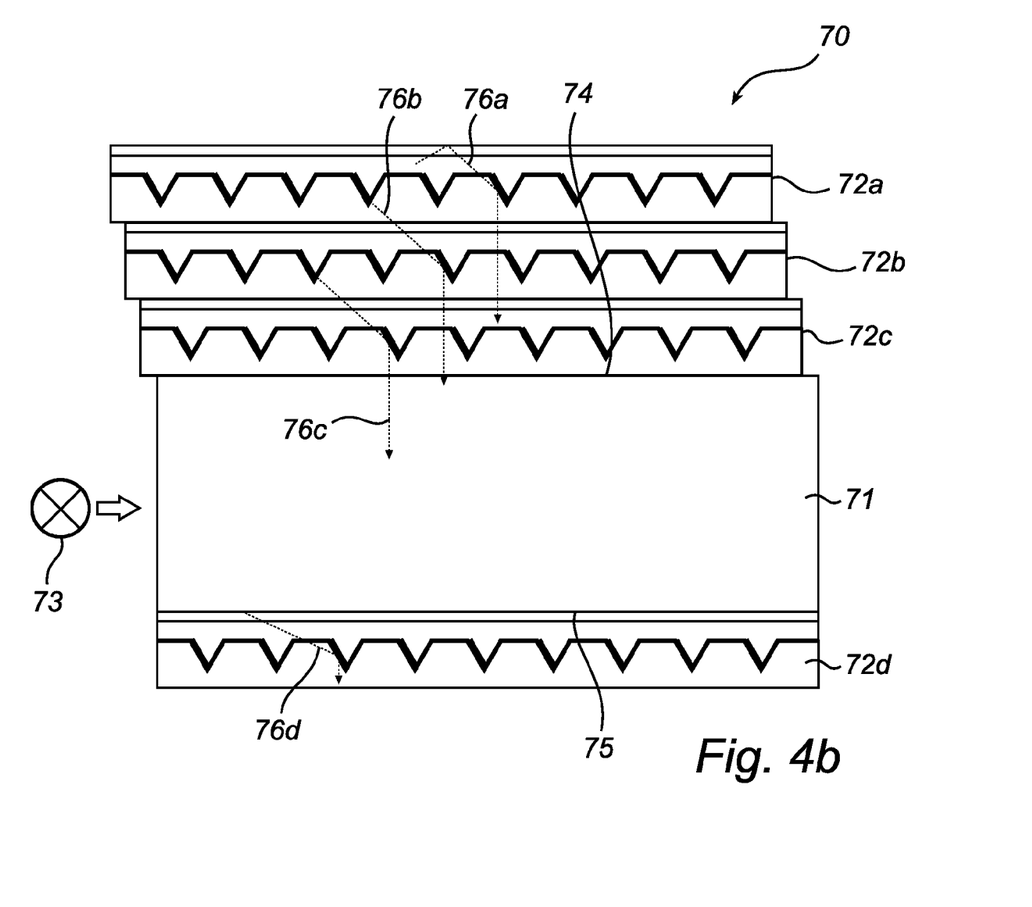

FIG. 4a-b are schematic cross-section views of embodiments of the optical element according to the present invention, in which the optical element functions to outcouple light from a light guide.

In FIG. 4a, a portion of an optical element 50 adapted to function as a light guide having outcoupling structures is shown having a first optical member 51, a second optical member 52 and a third optical member 53. Light emitted by a light source 54 and having entered the light guide 50 will be outcoupled by the reflectors 55a-c embedded in the optical element 50. The reflectors 55a-c are, as discussed above, formed by cavities formed at an interface between the first 51 and second 52 optical members at locations defined by reflector-defining portions 56a-c of indentations, here in the form of essentially parallel grooves 57a-c in the first optical member 51.

When impinging on a reflector 55b at an angle above the threshold for total internal reflection (TIR), a beam of light will be totally reflected such that it can exit the light guide through the bottom face 58 of the light guide 50, as indicated by the arrow 59 in FIG. 4a. If, on the other hand, a beam of light hits a reflector 55a at an angle below the threshold angle for total internal reflection, some of the light will pass through the cavity/reflector 55a. This is illustrated for an beam which hits the reflector 55a almost perpendicularly by the arrow 60 in FIG. 4b. This beam, given that the index of refraction of the first 51, second 52, and third 53 optical members are all substantially identical ($n_1 \approx n_2 \approx n_3$) will pass straight through the cavity/reflector 55a (the small parallel translation over the width of the cavity 55a is disregarded—the width of the cavity 55a is typically in the order of μm), to be subjected to total internal reflection at the interface between the third optical member and the ambient atmosphere instead. Following this total internal reflection, the beam again travels towards the reflectors 55a-c and will be outcoupled, directly or following further reflections in either of the interfaces between the light guide 50 and the ambient atmosphere.

Hereby, a light guide having a substantially perfectly directional outcoupling can be formed through proper selection of materials and dimensions.

In FIG. 4b, a portion of an outcoupling light guide 70 is shown including a light guide member 71 having several co-operating optical members 72a-d on both sides thereof. Similarly to the light guide in FIG. 4a, the light guide 70 in FIG. 4b is configured to outcouple light from a light source 73 having entered the light guide 70.

On the top side 74 of the light guide member, three guiding/outcoupling optical elements 72a-c are provided, each having a plurality of embedded reflectors, which are each formed at a cavity at a material interface between optical members. These optical elements 72a-c, together with the optical element 72d provided on the bottom side 75 of the light guide member 71 function to outcouple light from the light guide 70 as described above in connection with FIG. 4a and illustrated by the arrows 76a-d in FIG. 4b. Through the provision of several parallel outcoupling optical elements 72a-c, light over a larger angular spread can efficiently be outcoupled in the desired direction.

In the embodiment schematically illustrated in FIG. 4b in particular, the optical elements 72a-d may be preformed and later attached to the light guide member 71 (and to each other). For example, these relatively thin optical elements 72a-d may be formed in a reel-to-reel process, which is likely to be a cost-efficient production method.

Figure 5A:
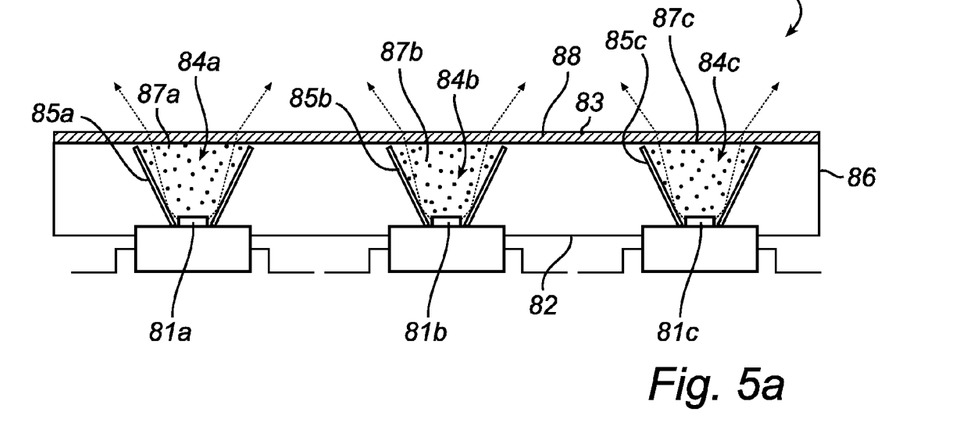
FIGS. 5a-b are schematic cross-section views of embodiments of the optical element according to the present invention, in which the optical element functions to collimate light.
Figure 5B:
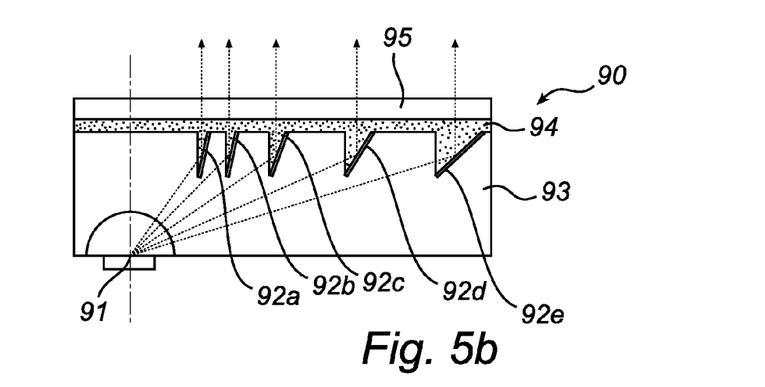

FIGS. 5a-b are schematic cross-section views of embodiments of the optical element according to the present invention, in which the optical element functions to collimate light.

In FIG. 5a, an optical element 80, in the form of a collimator plate for collimating light emitted by a plurality of light sources 81a-c arranged to couple light into a first face 82 of the optical element, such that the collimated light exits an opposite, second face 83 of the optical element 80.

As illustrated in FIG. 5a, each of the collimators 84a-c arranged to collimate the light from the respective light source 81a-c, is formed by a TIR-reflector at a cavity 85a-c between a first optical member 86 and a respective second optical member 87a-c. A third optical member 88 is provided on top of each of the second optical members 87a-c. The function and formation of the reflectors 85a-c in the collimator plate is similar to what was described above for the light guide embodiments of FIGS. 4a-b.

The cross-section of each of the cavities 85a-c forms a closed loop in a plane parallel to the second face 83 of the optical element 80. The shape of the collimator, including the cross section, depends on the desired shape of the collimated light beam. For example, for a beam having a circular cross-section, the cavity cross-section should typically also be circular.

In FIG. 5b, a second example of a collimator plate 90 is shown, where the light emitted by a light source 91 is collimated by several concentric reflectors 92a-e having increasing inclination with respect to a normal to the collimator plate with increasing distance from the light source 91. Each of the reflectors is formed at a cavity between a first optical member 93 and a second optical member 94. On top of the second optical member 94, a third optical member 95 is provided.

The person skilled in the art realizes that the present invention by no means is limited to the preferred embodiments described above. For example, a collimator, just as was described above for a light guide, may comprise a plurality of optical elements, which may have been preformed in, for example, a reel-to-reel process.

Experimental Setup

A specific example of a method for manufacturing an optical element according to the present invention will now be described with reference to FIG. 6.

Step 1: Replication

Figure 6:
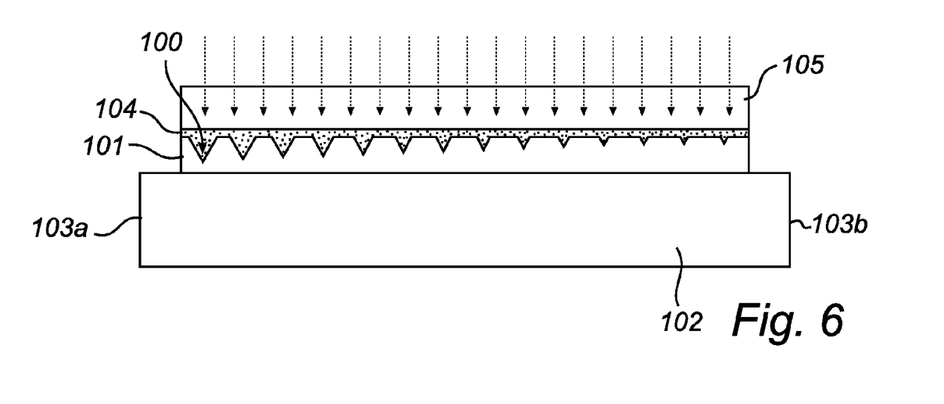
FIG. 6 schematically illustrates an exemplary outcoupling light guide according to an embodiment of the present invention.

Using conventional replication by photo-polymerization techniques, replicas 100 (only one of these is indicated in FIG. 6 for clarity of drawing) of micro-grooves were obtained in a 2P acrylate material 101 on a substrate carrier 102 of PolyMethylMethAcrylate (PMMA). The PMMA-carrier 102 functions as a lightguide substrate into which light from a light source such as a Cold Cathode Fluorescent Lamp (CCFL) or Light Emitting Diode (LED) is injected at the edges 103a-b. The grooves 100 had a width at the free 2P surface varying from 100 to 20 microns. The top angle of the grooves was 50°. The corresponding depth of the grooves can therefore easily be calculated and is just a bit larger than the width.

After replication, the micro-optic lightguide was annealed at 125° C. for 12 hours in order to thermally increase the degree of polymerisation (conversion) to deactivate the remaining reactivity of the 2P bulk and surface material.

Step 2: Coating

Coating of the Micro-Structures

The micro-groove structures 100 were coated with high shrinkage monomers 104 and covered by a top foil 105 or top sheets (plastic or glass). Monomers that were used are hexanedioldiacrylate (HDDA) or hexanedioldimethacrylate (HDDMA). These monomers result in a high shrinkage upon photo-polymerisation: their shrinkage according to literature is in the order of 16%.

Coating of Top Foil

The top foil 105 or top sheets were coated with an adhesion promoter. This was experimentally achieved using thin glass plates. The glass plates received a UV-ozone cleaning treatment followed with the gas phase deposition of an acrylate-functionalized aminosilane (Merck's Silane A 174) by exposing the glass plate to the A 174 material in an evacuated desiccator. Subsequently, the glass was "baked" for 1 hour at 60° C. to stimulate the surface reaction between the aminosilane and the glass surface. The result of this treatment is that the glass surface contains a very thin layer ("mono-layer") of adhesion promoting acrylate surface group capable of chemically reacting with the acrylate coating.

Step 3: Shrinking

The coating was cured, as illustrated by the arrows in FIG. 6, by photo-polymerization using UV-light in a nitrogen ($N_2$) environment in order to prevent inhibition of the light induced reactions by oxygen ($O_2$) especially near the edges that are in free contact with air.

During photo-polymerisation the monomer 100 is converted into a polymer by a free radical chain reaction mechanism. As a result, the relatively large distances between monomers is replaced by short size chemical bonds between monomers forming a polymer. This results in a reduction of the free-volume inside the material: the density is increased and the volume is reduced. By curing a monomer film by photo-polymerisation this results in a reduction of the thickness of the film.

By coating a pre-structured surface containing microstructures 100 (such as micro-grooves), the material also shrinks inside the grooves. This results in stress in the material cured inside the grooves and exerts a stress on the interface between the cured monomer and the pre-structured micro-optic surface. Depending on the adhesion between the two materials at the interface and the amount of stress present, this can lead to delamination at the surface: surface contact disappears and a vacuum is introduced between the two delaminated surfaces. It is likely that the newly formed vacuum intermediate layer is quickly filled-up with gas, which is molecularly dissolved in the plastic materials that are normally used. The resulting air-gap is likely to be several microns in thickness.

The invention claimed is:

1. A method for manufacturing an optical element, said method comprising the acts of:
   providing a first optical member having at least a first surface with a structure formed therein, wherein at least a portion of said structure is configured to have a lower threshold for release of a substance adhered thereto than neighboring portions of the first surface;
   providing on said first surface of the first optical member a second optical member formed by a shrinkable substance;
   shrinking said substance such that said second optical member is released from said first optical member at said portion and a cavity is formed by parallel surfaces of said first and second optical members at said portion, enabling total internal reflection at at least one of a first interface between said first optical member and said cavity and a second interface between said second optical member and said cavity, wherein said cavity is between the neighboring portions devoid of cavities, and wherein a distance between the first optical member and the second optical member at the portion is larger than a distance between the first optical member and the second optical member at the neighboring portions.

2. The method according to claim 1, wherein said portion of said structure is different from said neighboring portions of the surface with respect to at least one of geometry and surface properties, in order to obtain said lower threshold for release.

3. The method according to claim 1, wherein said structure is an indentation.

4. The method according to claim 3, wherein said shrinkable substance is adapted to fill said at least one indentation when being provided on said first surface of the first optical member.

5. The method according to claim 1, wherein:
   said shrinkable substance is formed from a polymerizeable material; and
   said shrinking step comprises the step of polymerizing said material.

6. The method according to claim 5, wherein said polymerizeable material is photo-polymerizeable; and said step of polymerizing comprises the step of irradiating said photo-polymerizeable material with light having a suitable wavelength range.

7. The method according to claim 1, further comprising the step of:
   providing a third optical member on top of said second optical member, for restricting material transport of said shrinkable substance during shrinking, wherein said third optical member is a relatively rigid sheet which, on a side thereof facing said second optical member, is treated to achieve a good adhesion to said shrinkable substance.

8. An optical element, comprising:
   a first optical member having at least one indentation at a first surface thereof; and
   a second optical member attached to said first surface of the first optical member, said second optical member essentially conforming to said at least one indentation in the first optical member;
   wherein first portions of an interface between the first optical member and the second optical member include a cavity and second portions adjacent to the first portions are devoid of cavities so that said cavity is between two of the second portions, and
   wherein the cavity is located at said at least one indentation and is formed by parallel surfaces of the first optical member and the second optical member, and wherein a distance between the first optical member and the second optical member at the first portion is larger than a distance between the first optical member and the second optical member at the second portions.

9. The optical element according to claim 8, wherein at least one of said first and second optical members is a high-shrinkage polymer.

10. The optical element according to claim 8, further comprising a third optical member covering and adhering to said second optical member.

11. The optical element according to claim 8, wherein said at least one indentation is a groove.

12. The optical element according to claim 11, wherein each of a plurality of consecutive cavities is formed on the same side of their respective grooves.

13. The optical element according to claim 11, wherein a cross-section of said groove is asymmetrical with respect to a line passing through a portion of said groove, said portion of said groove being furthest from said first optical member.

14. The optical element according to claim 8, wherein a cross-section of each of said indentations forms a closed loop in a plane parallel to said first surface.

15. An illumination device comprising:
   the optical element according to claim 8; and
   at least one light source arranged to couple light into said optical element.

* * * * *